United States Patent [19]
Stark et al.

[11] 3,761,824
[45] Sept. 25, 1973

[54] PULSE FREQUENCY DIVIDER

[75] Inventors: Reinhard Stark; Gunther Steinmuller, both of Nurnberg, Germany

[73] Assignee: Siemens Aktiengesellschaft, Berlin, Munich, Germany

[22] Filed: Nov. 23, 1971

[21] Appl. No.: 201,474

[30] Foreign Application Priority Data

Nov. 25, 1970 Germany .................. P 20 57 903.7

[52] U.S. Cl. .................................... 328/39, 328/42
[51] Int. Cl. ............................................ H03k 21/00
[58] Field of Search ............. 307/225–226, 220, 167, 232–233; 328/37, 30, 42, 38, 39, 25

[56] References Cited

UNITED STATES PATENTS

| | | | |
|---|---|---|---|
| 3,596,187 | 7/1971 | Thompson | 328/37 |
| 3,614,632 | 10/1971 | Leibowitz | 328/37 |
| 3,420,990 | 1/1969 | Andrea | 328/38 |
| 3,281,527 | 10/1966 | Davis | 307/220 |
| 3,258,696 | 6/1966 | Heymann | 328/37 |
| 3,609,391 | 9/1971 | Hatano | 328/37 |
| 3,571,576 | 3/1971 | Satterfield | 307/220 |
| 3,551,825 | 12/1970 | DuVivier | 328/25 |
| 3,660,767 | 5/1972 | Yoshino | 328/42 |

*Primary Examiner*—John W. Huckert
*Assistant Examiner*—R. E. Hart
*Attorney*—Arthur E. Wilfond et al.

[57] ABSTRACT

A frequency divider has an AND gate having an output connected in common to the reset inputs of a chain circuit of bistable flip flops. The frequency divider drives a presettable number of pulses of an input pulse train from the flip flops via a selector switch connected to their outputs. The outputs of the flip flops are connected to the inputs of the AND gate via preselectable circuit connections for setting the denominator of the number of pulses.

5 Claims, 3 Drawing Figures

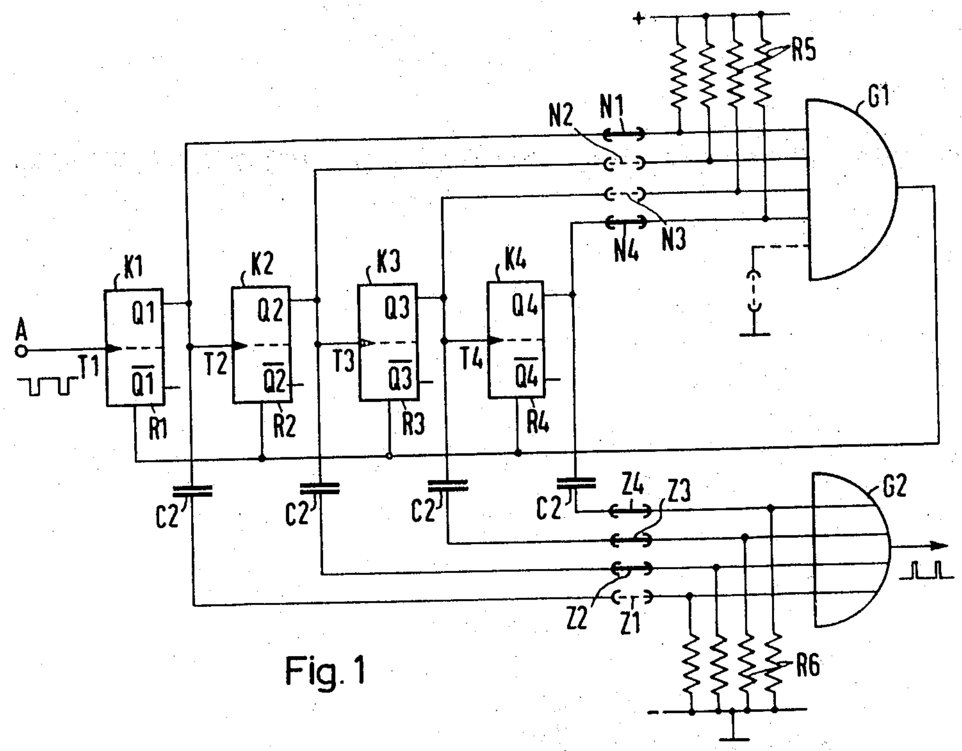
Fig. 1
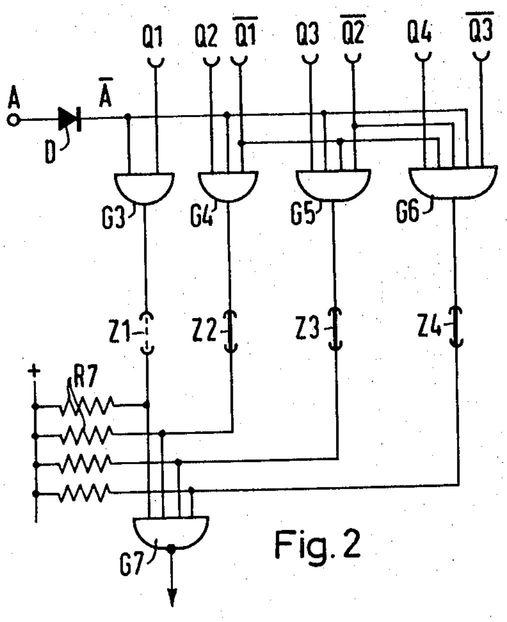
Fig. 2
| | Q4 | Q3 | Q2 | Q1 |
|---|---|---|---|---|
| | 8 | 4 | 2 | 1 |
| 0 | O | O | O | O |
| 1 | O | O | O | L |
| 2 | O | O | L | O |
| 3 | O | O | L | L |
| 4 | O | L | O | O |
| 5 | O | L | O | L |
| 6 | O | L | L | O |
| 7 | O | L | L | L |
| 8 | L | O | O | O |
| 9 | L | O | O | L |
Fig. 3

PULSE FREQUENCY DIVIDER

The invention relates to a pulse frequency divider.

In the pulse frequency divider of the invention, a presettable number of pulses of the input pulse train can be derived from a chain circuit of bistable flip flops via a selector switch, or the like, connected to the outputs of the bistable flip flop stages.

A constant reference frequency is utilized in pulse frequency dividers used in control and command technology. It is also important that the mutual spacing in time of the individual pulses of the pulse train be equal. In known frequency dividers, an appropriate reset pulse is supplied, for this reason, to the counting chains which comprise bistable flip flops connected in tandem. The timing of the reset pulse is here dependent upon the frequency desired in each case. For this reason, very expensive and complex circuits are required which make a selection corresponding to the preset frequency from the pulses simultaneously appearing at the outputs of the bistable flip flops for each input pulse of the reference oscillator. This is accomplished in such a manner that not only the number of of pulses delivered per unit time is constant, but also the mutual spacing of the pulses in time is equal.

In a known pulse frequency divider of the aforedescribed type, as disclosed in German published Pat. application No. 1,100,084, a definite number of the bistable flip flops is connected via a respective coincidence gate with more than one of the remaining bistable elements, for the purpose of obtaining the reset pulse. This definite number of bistable flip flops thus becomes selectively excited, depending upon the condition of the other bistable elements. The frequency is derived via a bus which is connected to the inverse outputs of the bistable flip flops via a selector switch and differentiating members.

Since it is desired in many cases, particularly in view of reliable switching, to perform the switching statically and not to differentiate, it has been further proposed in German published Pat. application No. 1,174,362 that the pulses entering the counting chain be supplied per decade to a system of AND and OR gates. The gate system feeds to the output of the pulse frequency setting device rectangular pulse trains which correspond to the set selector switch position and are distributed as uniformly as possible. All these known pulse frequency dividers still necessitate a relatively high expenditure.

An object of the invention is to provide a pulse frequency divider which is simpler in design than the known pulse frequency dividers and, in addition, permits the setting of a selected divider ratio $k = Z/N$. This is desirable particularly when, for example, a measurement result is available in digital form, where the significance of the pulses of the sensor in most cases does not agree with the significance of the pulses of the connected display unit.

In accordance with the present invention, the pulse frequency divider has bistable flip flops having outputs connected via another presettable circuit connection, for the purpose of setting the divisor or denominator, to the inputs of an AND gate. The output of the AND gate is connected to the reset inputs of the bistable flip flops.

In accordance with the invention, a pulse frequency divider for deriving a presettable number of pulses of an input pulse train from a chain circuit of bistable flip flops via selector switch means connected to the outputs of the flip flops, each of the flip flops having an input, a reset input, an output and an inverse output and the number of pulses having a numerator and a denominator, comprises an AND gate having inputs and having an output connected in common to the reset inputs of the flip flops. Preselectable circuit connecting means is provided. Means connects the outputs of the flip flops to the inputs of the AND gate via the preselectable circuit connecting means for setting the denominator.

Additional preselectable circuit connecting means is provided and the AND gate has an additional input connected to the additional preselectable circuit connecting means.

The selector switch means comprises plug-in circuit connecting means. The pulse frequency divider further comprises differentiating members, an OR gate having inputs and an output for providing the numerator frequency and a voltage source having a positive terminal and a negative terminal. Means connects the outputs of the flip flops to the inputs of the OR gate via the differentiating members and the plug-in circuit connecting means for setting the numerator. Means connects the inputs of the OR gate to the negative terminal of the voltage source via parts of the differentiating members.

The pulse frequency divider further comprises NAND gates having inputs connected to the outputs and inverse outputs of the flip flops and having outputs. An additional NAND gate has inputs and an output for providing the numerator frequency. Means connects the outputs of the NAND gates to the inputs of the additional NAND gate via the plug-in circuit means for setting the numerator. Each of the NAND gates has an additional input and input means connected to the additional input of each of the NAND gates supplies an input pulse train.

A voltage source has a positive terminal and a negative terminal. A first plurality of resistors, a second plurality of resistors, and a third plurality of resistors are provided. The third plurality of resistors are included in the differentiating members. Means connects the inputs of the AND gate to the positive terminal of the voltage source via the first plurality of resistors. Means connects the inputs of the OR gate to the negative terminal of the voltage source via the second plurality of resistors. Means connects the inputs of the additional NAND gate to the positive terminal of the voltage source via the third plurality of resistors.

In order that the invention may be readily carried into effect, it will now be described with reference to the accompanying drawing, wherein:

FIG. 1 is a circuit diagram of an embodiment of the pulse frequency divider of the invention having dynamic coupling out of the divider frequency;

FIG. 2 is a circuit diagram of a circuit for deriving the divider frequency by means of statically switched gate linkages; and FIG. 3 is a table showing the various conditions of the bistable flip flops of the circuit of FIG. 1.

In FIG. 1, four bistable flip flops K1, K2, K3 and K4 change their condition if the condition of the inputs T1, T2, T3 and T4 thereof changes from L to O. If four bistable flip flops are used, the denominator and numerator can be set from 1 to 15, corresponding to $n = 4$. For this purpose, the outputs Q1, Q2, Q3 and Q4 of the bistable flip flops K1, K2, K3 and K4 are connected via circuit connections N1, N2, N3 and N4 to the inputs of an AND gate G1. The output of the AND gate G1 is connected to reset inputs R1, R2, R3 and R4 of the bistable flip flops K1, K2, K3 and K4. The inputs of the AND gate G1 are connected to the positive terminal of a voltage source via resistors R5.

As is hereinafter explained in further detail, the circuit of FIG. 1 can be preset, by means of the circuit connections N1 to N4, up to which number the denominator should count. When the preset number is reached, a reset pulse is transmitted via the output of the AND gate G1 to the reset inputs R1 to R4 of the bistable flip flops K1 to K4.

The counter pulses are derived in a known manner by differentiating members, each of which comprises a capacitor C2 and a resistor R6. Each of the capacitors C2 is connected, on the one hand, to a corresponding one of the outputs Q1 to Q4 of the bistable flip flops K1 to K4 and, on the other hand, via circuit connections Z1, Z2, Z3 and Z4 to a corresponding one of the inputs of an OR gate G2. The divider frequency may be derived from the output of the OR gate G2.

The inputs of the OR gate G2 are connected to the negative terminal of the voltage source via the resistors R6. The positive flanks of the outputs Q1 to Q4 of the bistable flip flops K1 to K4 are utilized for the numerator. That is, an output signal is always provided at the OR gate G2 if the condition of one of the outputs preselected via the circuit connections Z1 to Z4 changes from zero to L.

FIG. 3 is a table showing the different conditions of the bistable flip flops K1 to K4. The Binary Coded Decimal Code or BCD code is utilized in FIG. 3.

The number $a_m$ of the pulses delivered by the flip flops Km, wherein $m = 1$ to $n$, is obtained from the equation $$a_m \leqslant N/2^m + 0.5$$

Therefore, $a_m$ is the next smaller integral number. The numerator is derived from the sum of the pulses $a_l \ldots a_n$.

In the example of implementation according to FIG. 1, the division ratio 4/9 is realized. The denominator $N = 9$ is obtained from $1 \times 8 + 0 \times 4 + 0 \times 2 + 1 \times 1$. Therefore, the connections N1 and N4 must be plugged in. The output pulses of the individual flip flops are obtained from the foregoing equation as follows:

$$a_1 \leqslant 9/2 + 0.5 = 5 \rightarrow a_1 = 5$$

$$a_2 \leqslant 9^2/4 + 0.5 = 2.75 \rightarrow a_2 = 2$$

$$a_3 \leqslant 9/8 + 0.5 = 1.625 \rightarrow a_3 = 1$$

$$a_4 \leqslant 9/16 + 0.5 = 1.0625 \rightarrow a_4 = 1$$

When the circuit connections $Z_2$, $Z_3$ and $Z_4$ are plugged in, $Z = 4$ is obtained as the numerator.

In the circuit of FIG. 1, the denominator can be selected only up to $2^n - 1$. An additional input of the AND gate G1 is indicated by broken lines. In this case, counting for the denominator can go up to $2^n$.

The resistors R5 are selected so that in the presence of the circuit connections N1 and N4 and zero signals at the outputs Q1 and Q4 of the bistable flip flops K1 and K4, the corresponding inputs of the AND gate G1 have a zero signal.

FIG. 2 shows a circuit arrangement which permits divided counting pulses to be provided by appropriate gate interconnections. Components of similar function are identified by the same reference numerals. Each of a plurality of NAND gates G3, G4, G5 and G6 is connected to a corresponding one of the bistable flip flops K1, K2, K3 and K4. The inputs of the NAND gates G3, G4, G5 and G6 are connected, on the one hand, to the outputs Q1, Q2, Q3 and Q4 or to the inverse outputs $\overline{Q1}$, $\overline{Q2}$, $\overline{Q3}$ and $\overline{Q4}$. One input of each of the NAND gates G3 to G6 is connected to an input terminal A via an inverter D. The NAND gates G3 to G6 are therefore addressed in the rhythm of the input pulse train.

The pluggable circuit connections Z1, Z2, Z3 and Z4 permit the preselection of the corresponding numerator. The output of each of the NAND gates G3 to G6 is connected to a corresponding input of a NAND gate G7. The inputs of the NAND gate G7 are connected via resistors R7 to the positive terminal of the voltage source. A positive input signal is thus applied to the inputs of the NAND gate G7 which are not provided with a circuit connection. An output is always produced when the following conditions are fulfilled:

$$F = \bar{A}\, Q_1 \checkmark \bar{A}\, \bar{Q}_1\, Q_2 \checkmark \bar{A}\, \bar{Q}_1\, \bar{Q}_2\, Q_3 \checkmark \bar{A}\, \bar{Q}_1\, \bar{Q}_2\, \bar{Q}_3\, Q_4$$

As may be seen particularly from FIGS. 1 and 2, the cost of the pulse frequency divider of the invention is substantially lower than that of known dividers.

Selection switches may be utilized instead of the pluggable circuit connections N1 to N4 or Z1 to Z4, respectively, as in known frequency dividers. This, however, increases the cost.

While the invention has been described by means of a specific example and in a specific embodiment, it should not be limited thereto, for obvious modifications will occur to those skilled in the art without departing from the spirit and scope of the invention.

We claim:

1. A pulse frequency divider for deriving a variable number of pulses of an input pulse train from a chain circuit of bistable flip flops via selector switch means connected to the outputs of the flip flops, each of said flip flops having an input, a reset input, an output and an inverse output, the number of pulses having a numerator and a denominator, said frequency divider comprising an AND gate having inputs and having output connected to the reset inputs of the flip flops; preselectable circuit connecting means; means connecting the outputs of the flip flops to the inputs of the AND gate via the preselectable circuit connecting means for setting the denominator; additional preselectable circuit connecting means; differentiating members; an OR gate having inputs connected to the negative terminal of the voltage source and an output for providing the numerator frequency; a voltage source having a positive terminal and a negative terminal; and means connecting the outputs of the flip flops to the inputs of the OR gate via the differentiating members and the additional preselectable circuit connecting means for setting the numerator.

2. A pulse frequency divider as claimed in claim 1, wherein the AND gate has an additional input connected to the surfaces preselectable circuit connecting means.

3. A pulse frequency divider as claimed in claim 1, wherein the selection switch means comprises plug-in circuit connecting means, and further comprising NAND gates having inputs connected to the outputs and inverse outputs of the flip flops and having outputs, and additional NAND gate having inputs and an output for providing the numerator frequency, and means connecting the outputs of the NAND gates to the inputs of the additional NAND gate via the plug-in circuit means for setting the numerator.

4. A pulse frequency divider as claimed in claim 3, wherein each of the NAND gates has an additional input, and further comprising input means connected to the additional input of each of the NAND gates for supplying an input pulse train.

5. A pulse frequency divider as claimed in claim 3, differentiating members, an OR gate having inputs and an output for providing the numerator frequency, means connecting the outputs of the flip flops to the inputs of the OR gate via the differentiating members and the plug-in circuit connecting means for setting the numerator, further comprising a voltage source having a positive terminal and a negative terminal, a first plurality of resistors, a second plurality of resistors, the differentiating members including a third plurality of resistors, means connecting the inputs of the AND gate to the positive terminal of the voltage source via the first plurality of resistors, means connecting the inputs of the OR gate to the negative terminal of the voltage source via the second plurality of resistors and means connecting the inputs of the additional NAND gate to the positive terminal of the voltage source via the third plurality of resistors.

* * * * *